United States Patent
Jung et al.

(10) Patent No.: US 10,858,235 B2
(45) Date of Patent: Dec. 8, 2020

(54) AUTOMATIC WATER SUPPLY DEVICE

(71) Applicant: LG INNOTEK CO., LTD., Seoul (KR)

(72) Inventors: Jae Wook Jung, Seoul (KR); Lee Im Kang, Seoul (KR); Chang Hyuck Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 155 days.

(21) Appl. No.: 15/742,776

(22) PCT Filed: Jul. 6, 2016

(86) PCT No.: PCT/KR2016/007300
§ 371 (c)(1),
(2) Date: Jan. 8, 2018

(87) PCT Pub. No.: WO2017/007229
PCT Pub. Date: Jan. 12, 2017

(65) Prior Publication Data
US 2018/0201492 A1   Jul. 19, 2018

(30) Foreign Application Priority Data

Jul. 6, 2015 (KR) .................. 10-2015-0095771
Dec. 3, 2015 (KR) .................. 10-2015-0171252
Dec. 15, 2015 (KR) .................. 10-2015-0179386

(51) Int. Cl.
*B67D 1/12* (2006.01)
*B67D 1/08* (2006.01)
(Continued)

(52) U.S. Cl.
CPC .......... *B67D 1/1236* (2013.01); *B01D 35/04* (2013.01); *B67D 1/06* (2013.01); *B67D 1/08* (2013.01);
(Continued)

(58) Field of Classification Search
CPC ...... B67D 1/1236; B67D 1/1238; B67D 1/06; B67D 1/08; B67D 1/1206; B67D 3/0067;
(Continued)

(56) References Cited

U.S. PATENT DOCUMENTS 5,862,844 A * 1/1999 Perrin .................. B67D 1/1238
141/192
6,082,419 A * 7/2000 Skell .................... B67D 1/1236
141/198
(Continued)

FOREIGN PATENT DOCUMENTS

KR       10-0808138 B1    2/2008
KR       10-0832237 B1    5/2008
(Continued)

OTHER PUBLICATIONS

International Search Report in International Application No. PCT/KR2016/007300, filed Jul. 6, 2016.

*Primary Examiner* — Umashankar Venkatesan
*Assistant Examiner* — Andrew J Rost
(74) *Attorney, Agent, or Firm* — Saliwanchik, Lloyd & Eisenschenk

(57) ABSTRACT

An embodiment relates to an automatic water supply device comprising: a container seating portion, one side of which is open such that a container is placed; a water intake member arranged on the upper portion of the container seating portion so as to supply the container with a liquid; a container height measuring unit and a water level measuring unit arranged to be adjacent to the water intake member, respectively; and a control unit for comparing the height of the container, which is measured by the container height measuring unit, and the water level, which is measuring by the water level measuring unit, thereby checking whether the water level inside the container reaches a preset height or not, and adjusting the water level inside the container using
(Continued)

the result of the checking, wherein the container height measuring unit comprises a plurality of first optical sensors for sensing both ends of the upper end of the container, and can measure the height of the container in response to the result of sensing by the first optical sensors.

20 Claims, 16 Drawing Sheets

(51) Int. Cl.
| | | |
|---|---|---|
| *B67D 3/00* | (2006.01) | |
| *G01F 23/292* | (2006.01) | |
| *B67D 1/06* | (2006.01) | |
| *B01D 35/04* | (2006.01) | |
| *G06T 7/60* | (2017.01) | |
| *H04N 5/225* | (2006.01) | |
| *G01F 22/00* | (2006.01) | |

(52) U.S. Cl.
CPC ............. *B67D 1/12* (2013.01); *B67D 1/1206* (2013.01); *B67D 1/1238* (2013.01); *B67D 3/00* (2013.01); *B67D 3/0003* (2013.01); *B67D 3/0067* (2013.01); *B67D 3/0093* (2013.01); *G01F 23/292* (2013.01); *G06T 7/60* (2013.01); *H04N 5/225* (2013.01); *B67D 2001/1263* (2013.01); *G01F 22/00* (2013.01)

(58) Field of Classification Search
CPC .................... B67D 3/00; B67D 3/0003; B67D 2001/1263; B67D 1/124; B67D 2210/00065; G01F 23/292; G01F 22/00; B01D 35/04; H04N 5/225; G06T 7/60
See application file for complete search history.

(56) References Cited

U.S. PATENT DOCUMENTS

| | | | | |
|---|---|---|---|---|
| 6,100,518 | A * | 8/2000 | Miller .................... | G01B 11/02 141/1 |
| 7,690,403 | B2 * | 4/2010 | You ...................... | B67D 1/0871 141/198 |
| 8,109,301 | B1 * | 2/2012 | Denise .................... | G07F 9/023 141/360 |
| 8,167,004 | B2 * | 5/2012 | Lee ...................... | B67D 1/0888 141/192 |
| 8,695,646 | B2 | 4/2014 | Agam et al. | |
| 8,746,296 | B2 * | 6/2014 | Tobbe .................. | B67D 1/1236 141/198 |
| 8,813,794 | B2 * | 8/2014 | Ashrafzadeh ........ | B67D 1/0858 141/94 |
| 9,126,818 | B2 * | 9/2015 | Chase .................. | B67D 1/0858 |
| 2014/0103479 | A1 | 4/2014 | Luc et al. | |
| 2014/0319168 | A1 | 10/2014 | Chase et al. | |

FOREIGN PATENT DOCUMENTS

| | | |
|---|---|---|
| KR | 10-2008-0078487 A | 8/2008 |
| KR | 10-1011706 B1 | 2/2011 |
| KR | 10-2013-0102444 A | 9/2013 |
| KR | 10-2014-0068842 A | 6/2014 |
| KR | 10-1441240 B1 | 9/2014 |
| KR | 10-2015-0073603 A | 7/2015 |

* cited by examiner (a)　　　　　　　　(b)

AUTOMATIC WATER SUPPLY DEVICE

CROSS-REFERENCE TO RELATED APPLICATIONS

This application is the U.S. national stage application of International Patent Application No. PCT/KR2016/007300, filed Jul. 6, 2016; which claims priority to Korean Application Nos. 10-2015-0095771, filed Jul. 6, 2015; 10-2015-0171252, filed Dec. 3, 2015; and 10-2015-0179386, filed Dec. 15, 2015; the disclosures of each of which are incorporated herein by reference in their entirety.

TECHNICAL FIELD

Embodiments relate to an automatic water supply device, and more particularly, to an automatic water supply device which may sense a height of a container and supply a liquid to the container so as to reach a predetermined level matching the height of the container.

BACKGROUND ART

Recently, in order effectively acquire purified drinking water, water purifiers have been widely used in various spaces including homes. A water purifier is an apparatus which filters natural water, such as tap water or well water, (hereinafter, water in a state before purification is referred to as 'raw water'), and the water purifier filters raw water using a plurality of filters, removes foreign substances or harmful substances from the raw water and thus provides purified water.

For the purpose of user convenience, a water purifier having an automatic extraction function, which automatically discharges a fixed quantity of water when an extraction button is pressed, is widely used now.

However, the conventional automatic extraction function is a function of discharging a fixed quantity of purified water using a water discharging quantity according to time and, even if the size of a container provided to contain the fixed quantity of supplied water is small, the same quantity of water is supplied to the container and may thus overflow the container.

DISCLOSURE

Technical Problem

Embodiments provide an automatic water supply device provided with sensors arranged adjacent to a water intake member supplying a liquid and thus measuring a height of a container and a height of the liquid contained in the container.

Technical Solution

In one embodiment, an automatic water supply device includes a container seating portion having one open side such that a container is placed thereon, a water intake member arranged at the upper portion of the container seating portion so as to supply a liquid to the container, a container height measurement unit and a water level measurement unit arranged adjacent to the water intake member, and a control unit to check whether or not a level of the liquid in the container reaches a predetermined height by comparing a height of the container, measured by the container height measurement unit, with the level of the liquid, measuring by the water level measurement unit, and to adjust the level of the liquid in the container using a result of checking, wherein the container height measurement unit includes a plurality of first optical sensors to sense both ends of an upper end of the container, and measures the height of the container in response to a result of sensing by the first optical sensors.

The water level measurement unit may include a second optical sensor to sense the level of the liquid in the container.

One of the first optical sensors and the second optical sensor may include a Time of Flight (ToF) sensor.

An exit angle of light emitted by the second optical sensor to the liquid may be 5° to 7°.

The container height measurement unit may be arranged on at least one surface of the container seating portion.

The container height measurement unit may sense at least one of an upper end or a lower end of the container.

The container height measurement unit may be arranged on a lower surface of the container seating portion.

The container height measurement unit may include a first measurement unit arranged on an upper surface of the container seating portion and a second measurement unit arranged on a lower surface of the container seating portion, and an extension line of a point, where the first measurement unit is arranged, in the vertical direction and an extension line of a point, where the second measurement unit is arranged, in the vertical direction may be spaced apart from each other.

The container height measurement unit may include light emitting units arranged on one side surface of the container seating portion in the length direction of the container, and light receiving units arranged so as to correspond to the light emitting units.

The light emitting units may be arranged in parallel on a first side surface of the container seating portion, and the light receiving units may be arranged in parallel on a second side surface of the container seating portion facing the first side surface.

In another embodiment, an automatic water supply device includes a body forming an external appearance of the automatic water supply device, a water intake member arranged on one surface of the body to discharge water contained in the body, at least one camera module arranged on the surface of the body to pick up an image of a cup received in the body, and a control unit, wherein one image pickup unit is arranged in the at least one camera module so as to pick up the image of the cup.

The control unit may extract a height of the cup using the image of the cup picked up by the image pickup unit.

The image pickup unit may extract information regarding the height of the cup and a diameter of an inlet of the cup by collecting coordinate information of at least four points of the cup.

In accordance with yet another embodiment, an automatic water supply device includes a body forming an external appearance of the automatic water supply device and including a container seating portion such that a cup is placed thereon, a water intake member arranged on one surface of the body to discharge water contained in the body, and at least one sensor to measure a height of the cup placed on the container seating portion or a height of water contained in the cup, wherein the at least one sensor includes a light emitting unit to emit light to at least a part of the container seating portion and a sensing unit to sense the light, and an angle A formed between an optical axis of the light emitted by the light emitting unit and a plane of the container seating portion, on which the cup is placed, satisfies a conditional expression below, $$90°-B \leq A \leq 90°, \quad \text{Conditional Expression 1}$$

wherein B is 0.5 times a viewing angle of the light emitted by the light emitting unit.

The at least one sensor may include two or more sensors.

An optical axis of a light emitting unit of at least one of the two or more sensors may be tilted toward the body.

The container seating portion may include a coating member having designated reflectivity and provided on one surface of the container seating portion contacting the cup.

An upper surface of the container seating portion may be formed of a reflective member having designated reflectivity.

The reflectivities of the reflective member and the coating member may be 15% to 35%.

A maximum viewing angle of light emitted by the at least one sensor may be set by equation below, $$\theta = 2 \tan^{-1}(D/4L), \text{ and}$$

θ may mean a viewing angle of the light emitted by the at least one sensor, D may mean a diameter of a lower surface of the cup, and L may mean a height from the lower surface of the cup to the at least one sensor.

Advantageous Effects

An automatic water supply device in accordance with one embodiment may supply a liquid to a container so as to reach a designated height without manual operation, such as pressing of a switch for liquid supply, and thus be easily used.

BEST MODE

Hereinafter, embodiments to realize the above objects will be described in detail with reference to the annexed drawings.

Figure 1:
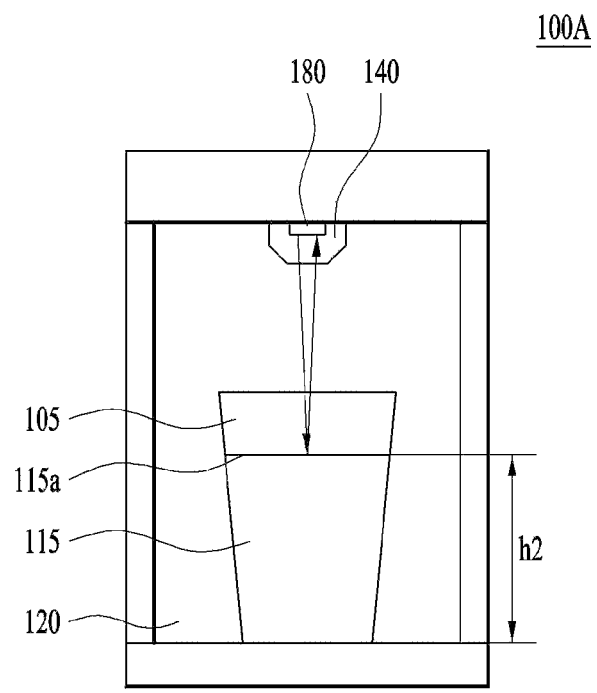
FIG. 1 is a schematic view illustrating a water level measurement unit of an automatic water supply device in accordance with a first embodiment.
Figure 2:
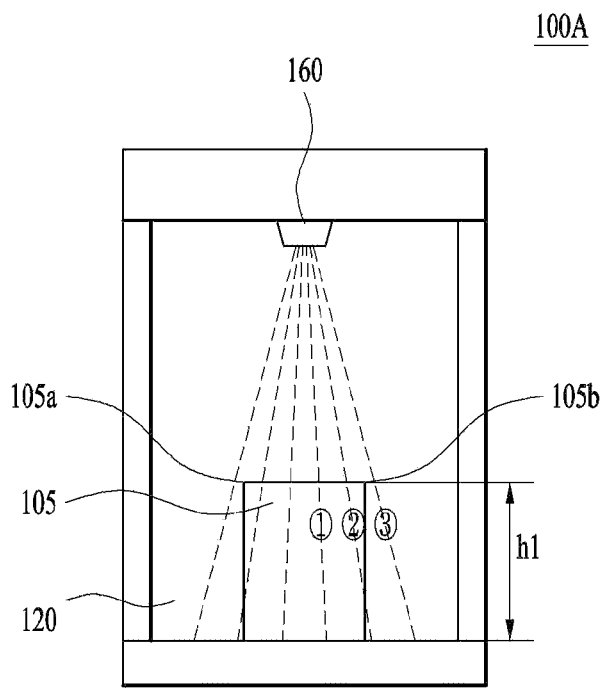
FIG. 2 is a schematic view illustrating a container height measurement unit of the automatic water supply device in accordance with the first embodiment.

FIG. 1 is a schematic view illustrating a water level measurement unit of an automatic water supply device in accordance with a first embodiment, and FIG. 2 is a schematic view illustrating a container height measurement unit of the automatic water supply device in accordance with the first embodiment.

With reference to FIGS. 1 and 2, an automatic water supply device 100A in accordance with the first embodiment includes a container seating portion 120, a water intake member 140, a container height measurement unit 160, a water level measurement unit 180 and a control unit (not shown).

The container seating portion 120 may have one side which is open such that a container is placed thereon. Further, the water intake member 140 may be arranged at the upper portion of the container seating portion 120 and supply a liquid to a container 105 seated on the container seating portion 120.

Further, the container height measurement unit 160 and the water level measurement unit 180 may be arranged adjacent to the water intake member 140. The container height measurement unit 160 may include a plurality of first optical sensors which senses seating of the container 105 on the container seating portion 120 and senses both ends 105a and 105b of the upper end of the container. Further, the container height measurement unit 160 may measure the height of the container in response to a result of sensing by the first optical sensors.

The water level measurement unit 180 may include a second optical sensor to sense a level of the liquid contained in the container, and the first optical sensors and the second optical sensor may include Time of Flight (ToF) sensors.

A Time of Flight (ToF) sensor is a sensor which may calculate a distance by measuring a time taken to emit light and then to receive reflected light and, in order to sense both ends of upper ends of containers having different sizes, the first optical sensors of the container height measurement unit 160 having different exit angles of light ①, ② and ③ may be arranged adjacent to the water intake member.

Further, the second optical sensor measures the level of the liquid contained in the container, and an exit angle of light emitted by the second optical sensor to the liquid may be 5° to 7°. Since the second optical sensor calculates a distance by measuring a time taken to emit light and then to receive reflected light, if the exit angle of light emitted by the second optical sensor to the liquid may be greater than 5° to 7°, an error in measurement of the level of the liquid may occur.

However, the exit angle of light emitted by the second optical angle to the liquid may be varied according to a height of the container seating portion on which a container is placed, and the exit angle of light if the height of the container seating portion is low may be greater than the exit angle of light if the height of the container seating portion is high.

The control unit (not shown) may compare a height h1 of the container, measured by the container height measurement unit 160, with a level h2 of the liquid in the container, measured by the water level measurement unit 180. Further, the control unit (not shown) may continuously measure the level of the liquid in the container while the liquid is supplied to the container, and thus check whether or not the level of the liquid in the container reaches a predetermined height. Moreover, the control unit may adjust the level of the liquid in the container using a result of checking.

Figure 3A:
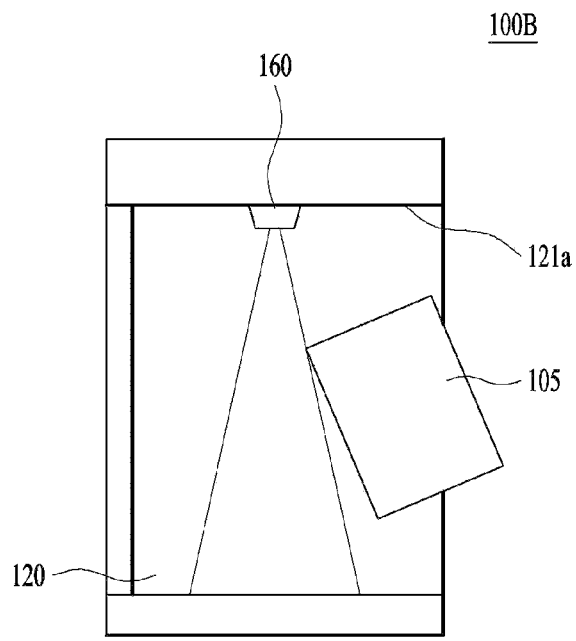
FIGS. 3a to 3c are schematic views illustrating container height measurement units of an automatic water supply device in accordance with a second embodiment.
Figure 3B:
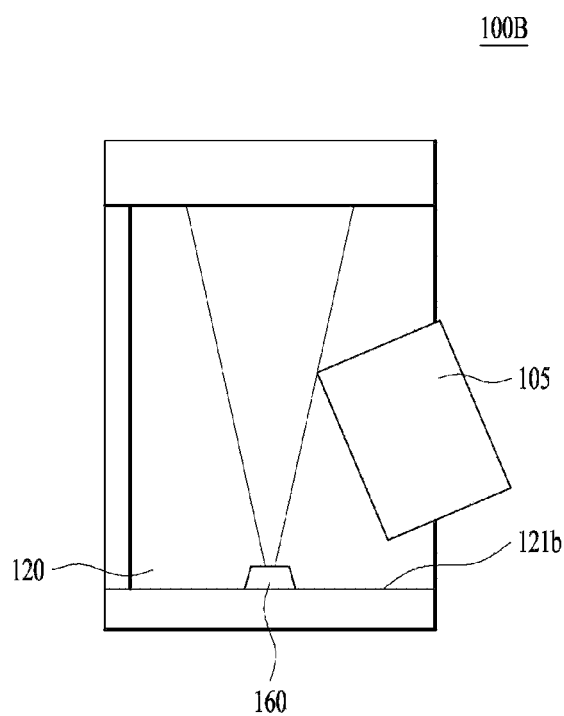
Figure 3C:
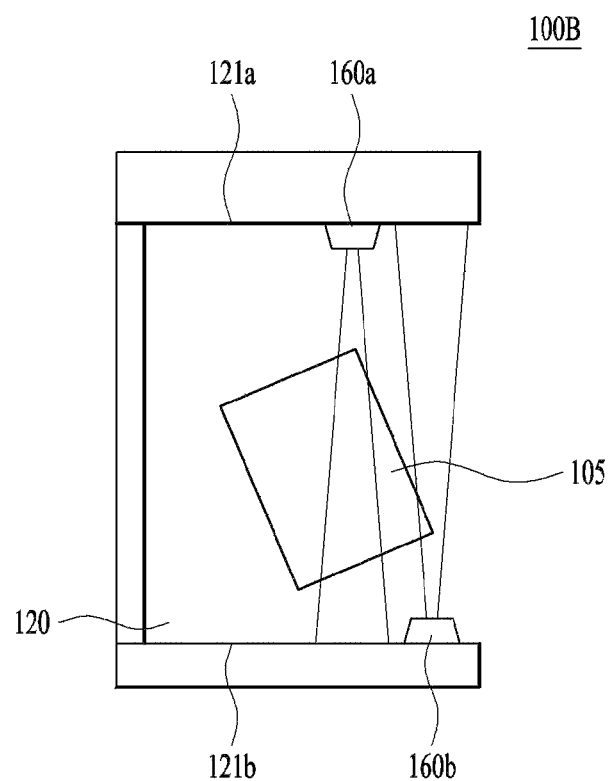

FIGS. 3a to 3c are schematic views illustrating container height measurement units of an automatic water supply device in accordance with a second embodiment.

With reference to FIGS. 3a to 3c, an automatic water supply device 100B in accordance with the second embodiment includes a container seating portion 120, a water intake member (not shown), a container height measurement unit 160, a water level measurement unit (not shown) and a control unit (not shown).

The container seating portion 120 may have one side which is open such that a container is placed thereon. Further, the water intake member (not shown) may be arranged at the upper portion of the container seating portion 120 and supply a liquid to a container 105 seated on the container seating portion 120.

The water level measurement unit may be arranged adjacent to the water intake member but is not illustrated in FIGS. 3a to 3c for convenience.

The container height measurement unit 160 and the water level measurement unit 180 may include Time of Flight (ToF) sensors, and an exit angle of light emitted by the water level measurement unit to a liquid contained in the container may be 5° to 7°.

A description of the container height measurement unit 160 and the water level measurement unit 180 in accordance with this embodiment, which are the same as the container height measurement unit 160 and the water level measurement unit 180 in accordance with the first embodiment, will be omitted.

The container height measurement unit of the automatic water supply device in accordance with the first embodiment may measure the height of a container when the container is horizontally placed on the bottom surface of the container seating portion, but the container height measurement unit 160 of the automatic water supply device in accordance with the second embodiment may measure the height of a container according to the position of the container. For example, when a user obliquely puts the container 105 into the inner space of the container seating portion 120, the container height measurement unit 160 of the automatic water supply device in accordance with the second embodiment may measure the height of the container by sensing the upper end of the container.

The container height measurement unit 160 may be arranged on at least one surface 121a or 121b of the container seating portion 120, i.e., on an upper surface 121a of the container seating portion, and, particularly, be arranged adjacent to the water intake member arranged on the upper surface of the container seating portion. Otherwise, the container height measurement unit 160 may be arranged on a lower surface 121b of the container seating portion.

Alternatively, the container height measurement unit 160 may include a first measurement unit 160a and a second measurement unit 160b arranged on different surfaces of the container seating portion, respectively. The first measurement unit 160a may be arranged on the upper surface 121a of the container seating portion, the second measurement unit 160b may be arranged on the lower surface 121b of the container seating portion, and the first measurement unit 160a and the second measurement unit 160b may be arranged such that an extension line of a point, where the first measurement unit 160a is arranged, in the vertical direction and an extension line of a point, where the second measurement unit 160b is arranged, in the vertical direction are spaced apart from each other.

The first measurement unit 160a arranged on the upper surface 121a of the container seating portion and the second measurement unit 160b arranged on the lower surface 121b of the container seating portion may sense at least one of upper and lower ends of the container, thereby measuring the height of the container.

The control unit (not shown) may compare the height of the container, measured by the container height measurement unit 160, with a level of the liquid in the container, measured by the water level measurement unit. Further, the control unit (not shown) may continuously measure the level of the liquid in the container while the liquid is supplied to the container, and thus check whether or not the level of the liquid in the container reaches a predetermined height. Moreover, the control unit may adjust the level of the liquid in the container using a result of checking.

Figure 4A:
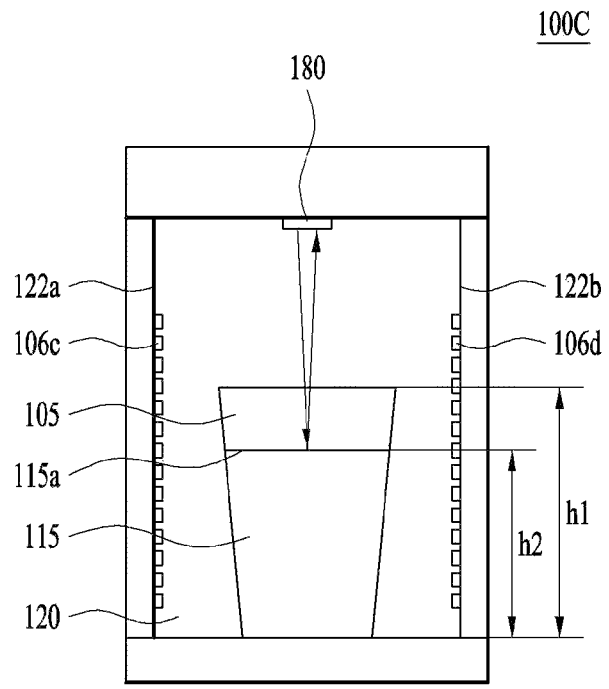
FIGS. 4a to 4c are schematic views illustrating container height measurement units of an automatic water supply device in accordance with a third embodiment.
Figure 4B:
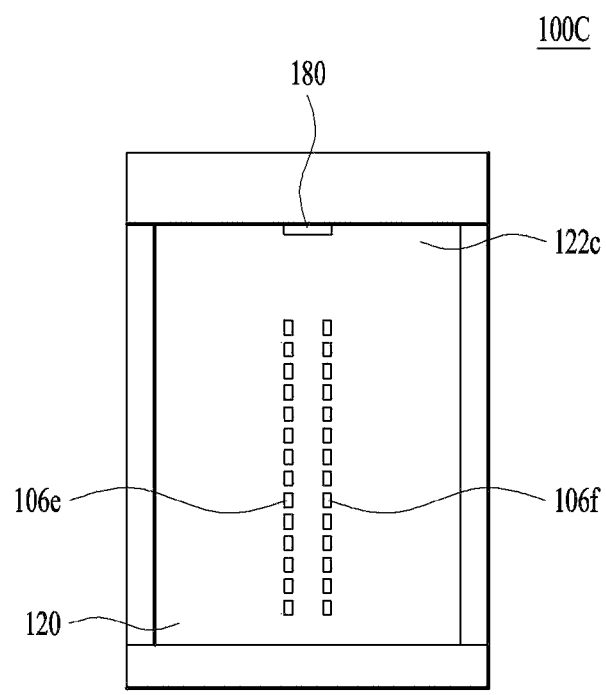
Figure 4C:
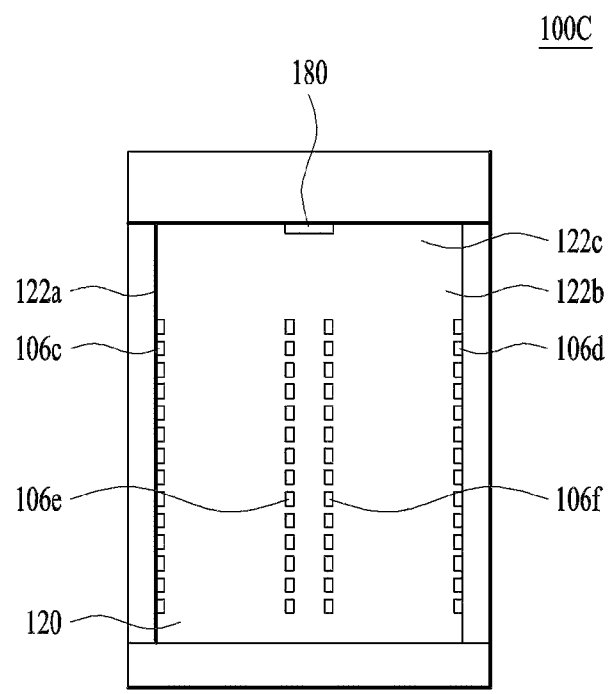

FIGS. 4a to 4c are schematic views illustrating container height measurement units of an automatic water supply device in accordance with a third embodiment.

With reference to FIGS. 4a to 4c, an automatic water supply device 100C in accordance with the third embodiment includes a container seating portion 120, a water intake member (not shown), a container height measurement unit 160c, 160d, 160e and 160f, a water level measurement unit 180 and a control unit (not shown).

The container seating portion 120 may have one side which is open such that a container is placed thereon. Further, the water intake member (not shown) may be arranged at the upper portion of the container seating portion 120 and supply a liquid to a container 105 seated on the container seating portion 120.

Further, the container height measurement unit 160 and the water level measurement unit 180 may include Time of Flight (ToF) sensors, and an exit angle of light emitted by the water level measurement unit to a liquid contained in the container may be 5° to 7°.

A description of the container height measurement unit 160 and the water level measurement unit 180 in accordance with this embodiment, which are the same as the container height measurement unit 160 and the water level measurement unit 180 in accordance with the first embodiment, will be omitted.

The container height measurement unit 160 may be arranged on at least one surface 121a or 121b of the container seating portion 120. The water level measurement unit 180 may be arranged adjacent to the water intake member.

The container height measurement unit 160 may include light emitting units 160c arranged on one side surface of the container seating portion 120 in the length direction of the container 105, and light receiving units 160d arranged so as to correspond to the light emitting units 160c.

The light emitting units 160c are arranged in parallel on one of side surfaces 122a, 122b and 122c of the container seating portion 120, i.e., a first side surface 122a, and the light receiving units 160d are arranged in parallel on another side surface facing the first side surface 122a, i.e., a second side surface 122b.

The light emitting units including a plurality of light emitting elements emit light to the light receiving units including a plurality of light receiving elements, and the light emitting units may emit light at once or emit light sequentially. When the container 105 is placed on the container receiving portion 120, a height h1 of the container corresponding to a height where light is not transmitted by the container 105 may be measured.

Alternatively, light emitting units 160e may be arranged in parallel on the remaining third side surface 122c of the container seating portion 120, and light receiving units 160f may be arranged in parallel adjacent to the light emitting units 160e on the third side surface 122c of the container seating portion 120. When a container is placed on the container seating portion, light emitted by the light emitting units including the light emitting elements is reflected by the surface of the container and then received by the light receiving units 160f and, thus, the height of the container may be measured.

Otherwise, simultaneously with the light emitting units 160c arranged in parallel on the first side surface 122a and the light receiving units 160d arranged in parallel on the second side surface 122b, the light emitting units 160e and the light receiving units 160f may be arranged adjacent to each other on the third side surface 122c.

The control unit (not shown) may compare a height h1 of the container, measured by the container height measurement unit 160, with a level h2 of the liquid contained in the container, measured by the water level measurement unit 180. Further, the control unit (not shown) may continuously measure the level of the liquid in the container while the liquid is supplied to the container, and thus check whether or not the level of the liquid in the container reaches a predetermined height. Moreover, the control unit may adjust the level of the liquid in the container using a result of checking.

Figure 5:
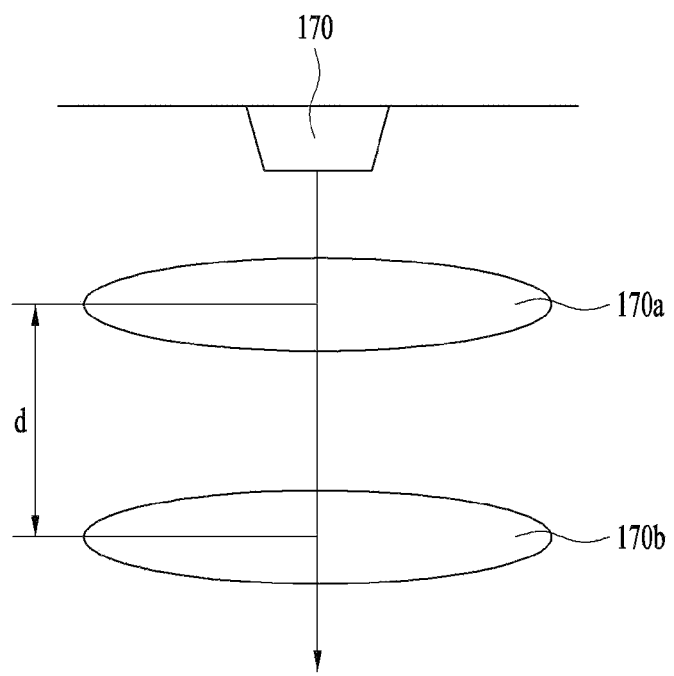
FIG. 5 is a schematic view illustrating an exit angle adjustment unit included in a height measurement unit of an automatic water supply device in accordance with a fourth embodiment.
Figure 6A:
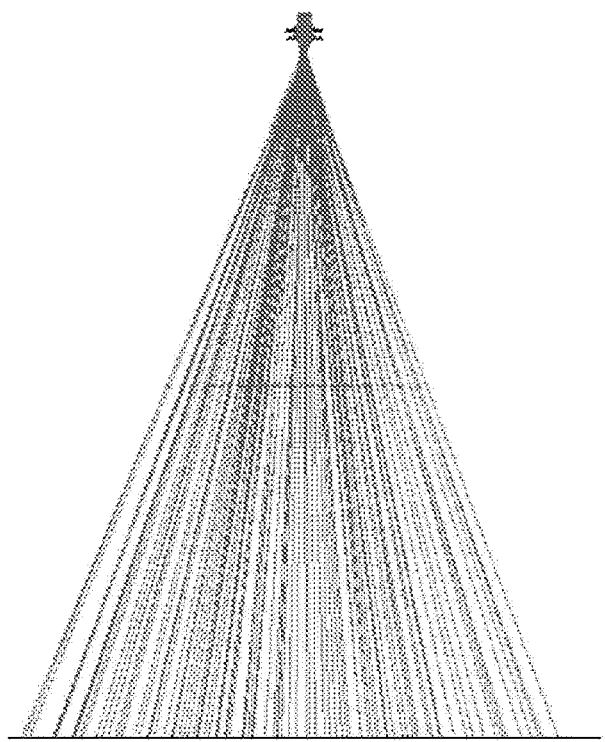
FIGS. 6a to 6c are views illustrating light emitted at different exit angles by the exit angle adjustment unit.
Figure 6B:
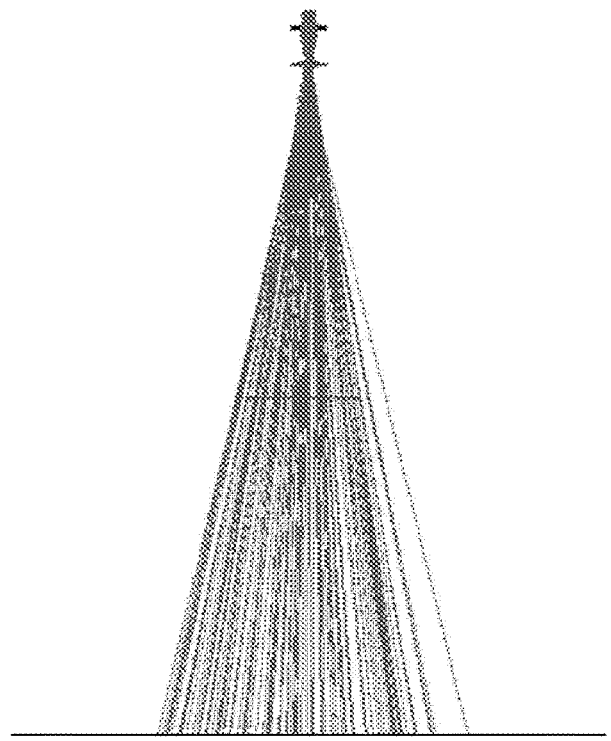
Figure 6C:
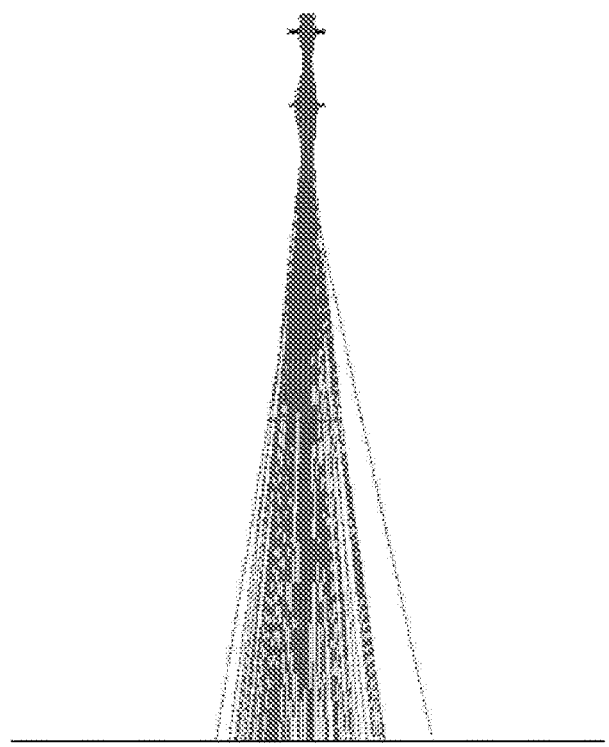

FIG. 5 is a schematic view illustrating an exit angle adjustment unit included in a height measurement unit of an automatic water supply device in accordance with a fourth embodiment, and FIGS. 6a to 6c are views illustrating light emitted at different exit angles by the exit angle adjustment unit.

An automatic water supply device in accordance with the fourth embodiment includes a container seating portion, a water intake member, a height measurement unit and a control unit.

The container seating portion may have one side which is open such that a container is placed thereon. Further, the water intake member may be arranged at the upper portion of the container seating portion and supply a liquid to the container seated on the container seating portion.

Further, the height measurement unit 170 may be arranged adjacent to the water intake member and measure a height of the container seated on the container seating portion or a level of the liquid contained in the container, and the height measurement unit 170 may include a Time of Flight (ToF) sensor.

The automatic water supply device in accordance with the fourth embodiment differs from the automatic water supply device in accordance with the first embodiment in that the automatic water supply device in accordance with the fourth embodiment may measure the height of the container and the level of the liquid in the container using one sensor.

The height measurement unit 170 in accordance with the fourth embodiment may include an exit angle adjustment unit including a plurality of lens 170a and 170b and adjusting an exit angle of light emitted by the height measurement unit.

In the fourth embodiment, the exit angle adjustment unit includes two lenses 170a and 170b, moves a focus of light emitted by the height measurement unit by adjusting a distance d between the two lenses, and may thus adjust an exit angle of the emitted light, as exemplarily shown in FIGS. 6a to 6c.

The exit angle adjustment unit may adjust an exit angle so as to measure both ends of the upper end of a container when the height of the container is measured, and decrease the exit angle under the control of the control unit so as to measure a level of a liquid contained in the container after measurement of the height of the container. Further, if the exit angle is within a range of 5° to 7°, the level of the liquid in the container may be measured.

The control unit may compare the height of the container, measured by the height measurement unit, with the level of the liquid contained in the container, measured by the height measurement unit, and thus check whether or not the level of the liquid in the container reaches a predetermined height. Further, the control unit may adjust the level of the liquid in the container using a result of checking.

In the above-described embodiments, when the container height measurement unit or the height measurement unit measures the height of a container, a ratio of the height of the container to a level of the liquid in the container is predetermined so that the liquid may be supplied to a level lower than the measured height of the container. Further, the water level measurement unit or the height measurement unit checks whether or not the liquid contained in the container reaches the predetermined level and, thus, water may be automatically supplied to the container without operation of a switch or lever for water supply.

The automatic water supply devices in accordance with the above-described embodiments may measure the height of a container regardless of the material or shape of the container and supply a liquid to a designated height of the container without manual operation, such as pressing of a switch for liquid supply, thus being easily used.

Further, the automatic water supply devices do not require an operation switch for supplying a liquid to a container and are thus simple in design.

Figure 7:
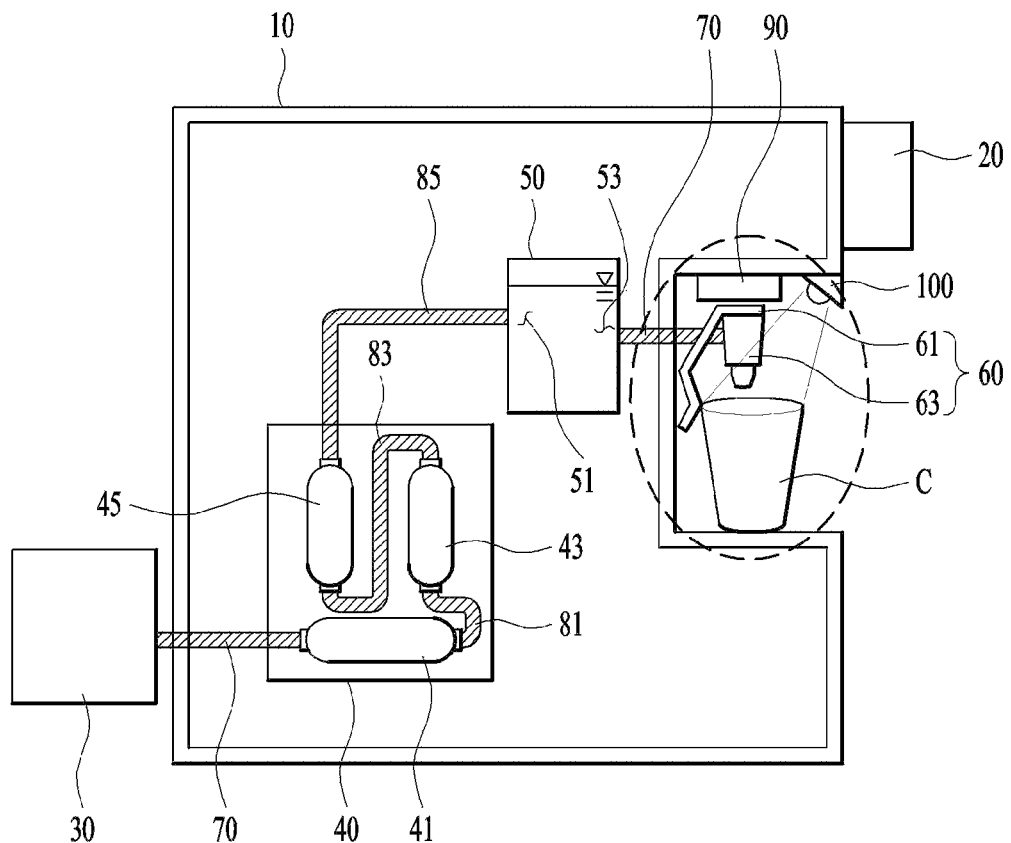
FIG. 7 is a view illustrating an automatic water supply device having a camera module in accordance with one embodiment.

FIG. 7 is a view illustrating an automatic water supply device in accordance with one embodiment.

With reference to FIG. 7, the automatic water supply device in accordance with this embodiment may include a water source 30 provided to feed water to the inside of the automatic water supply device, a filter unit 40 provided to filter out contaminants and foreign substances from water fed from the water source 30, a water storage unit 50 to store water, and a water intake member 60 provided to extract water stored in the water storage unit 50 to the outside.

The water intake member 60 may include a discharge valve 61 provided to adjust a quantity of water extracted to the outside, and a discharge unit 63 provided to form a water discharge path.

The discharge valve 61 may be provided such that, when a user applies pressure to the discharge valve 61 using a container to contain water, water is discharged from the discharge unit 63, and the discharge valve 61 may include a pressing part (not shown) providing a space pressed by the user using the container and a pivot part (not shown) to pivot the pressing part (not shown) using force applied to the pressing part (not shown) and thus to open or close the discharge valve 61.

The water source 30 may be a tank which stores unpurified raw water, or be a water pipe connecting a water supply source to the inside of a building. In this embodiment, the filter unit 40 may include a first filter 41 to remove impurities having a large particle size, such as rust, soil, sand, etc., a second filter 43 to remove heavy metals, phenol, bacteria, etc. from water through reverse osmosis, and a third filter 45 to finally purify water.

However, the number and functions of filters of the filter unit 40 may be different according to user needs and are not limited to the description of this embodiment as long as the filters may have a function of purifying water of the water source 30.

When a user opens the discharge unit 63, water may be discharged to the outside of the automatic water supply device. Although only one discharge unit 63 may be provided, two discharge units 63, i.e., a discharge unit 63 for cold water and a discharge unit 63 for hot water, may be generally provided, or three or more discharge units 63 may be provided.

The automatic water supply device in accordance with this embodiment may include a water supply duct 70 providing a flow path of water from the water source 30 to the filter unit 40, a filter duct unit 81, 83 and 85 providing flow paths of water within the filter unit 40, and a discharge duct 70 providing a flow path of water from the water storage unit 50 to the water intake member 60.

The filter duct unit 80 may include a first filter duct 81 providing a flow path of water from the first filter 41 to the second filter 43, a second filter duct 83 providing a flow path of water from the second filter 43 to the third filter 45, and a third filter duct 85 providing a flow path of water from the third filter 45 to the water storage unit 50.

Recently, according to spread of Internet of Things (IoT) and increase in smart home appliances including automatic water supply devices, smart automatic water supply devices are widely used in homes.

IoT is technology in which various things embedded with sensors and communication functions are connected to the Internet.

Here, the things may be various embedded systems including home appliances, mobile equipment, wearable computers, etc.

Therefore, the automatic water supply device in accordance with this embodiment may be provided such that, when a user applies pressure to the discharge valve 61, water is supplied from the water intake member 60, as described above, or be provided such that the automatic water supply device automatically recognizes a height of a cup C seated thereon and thus automatically supply a quantity of water matching the height of the cup C.

Here, if the size of the cup is not known, water may overflow the cup and, thus, a sensor to measure sizes of various cups is necessary.

Representatively, a stereo camera using binocular disparity may be used, as a method of measuring a height of a cup using a camera module.

However, in order to implement the stereo camera, the number of necessary optical systems is increased and, thus, manufacturing costs may be increased.

Further, in order to extract depth information, a complicated algorithm is required and calibration for extracting the depth information is carried out and, thus, a measurement time may be increased.

Therefore, the camera module and the automatic water supply device including the same in accordance with this embodiment propose a method of extracting shape, size and depth information of a cup using a mono camera module system with reference to FIGS. 8 to 11.

Figure 8:
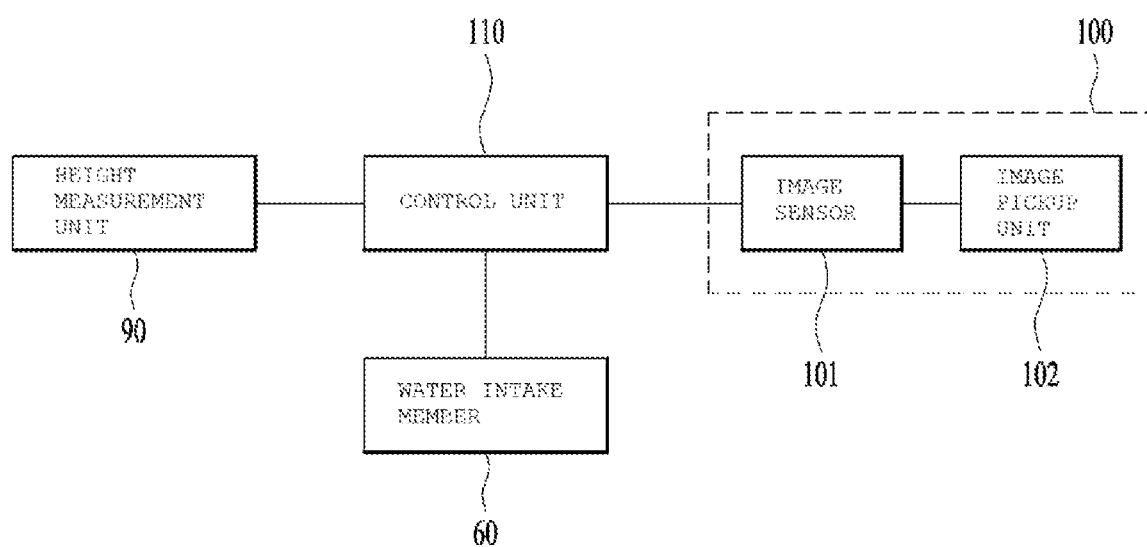
FIG. 8 is a block diagram of the automatic water supply device in accordance with the embodiment.

FIG. 8 is a block diagram of the automatic water supply device in accordance with the embodiment.

With reference to FIG. 8, the automatic water supply device in accordance with this embodiment may include a height measurement unit 90 to measure a height of water supplied to the inside of the cup C, a camera module 100 to extract information, such as a height of the cup C, etc., a control unit 110 to control a quantity of water supplied to the cup C by processing image information of the cup C measured by the camera module 100, and a water intake member 60 to supply water to the cup C on command from the control unit 110.

The height measurement unit 90 may include a depth information extraction device and measure a height of water contained in the cup C.

The depth information extraction device may be a Time of flight (TOF) camera including a light output unit to radiate light toward a target object and a light input unit to receive light reflected by the target object.

For example, by outputting designated light toward the upper surface of the cup C seated on the automatic water supply device in accordance with this embodiment and collecting light reflected by the upper surface of water contained in the cup C, depth information of the inside of the cup C may be acquired by calculating a time from when light is output to the upper surface of the cup C to when light reflected by the upper surface of water contained in the cup is received.

The camera module 100 may include an image pickup unit 102 to pick up image information of the cup C seated on the automatic water supply device by photographing the cup C, and an image sensor 102 to process the image information picked up by the image pickup unit 102.

Differently from the conventional stereo camera, the image information of the cup C picked up by one image pickup unit 102 may be converted into an electrical signal and the electrical signal may be transmitted to the control unit 110, and the control unit 110 may calculate diameter, height, inclination, etc. of the cup C using the image information of the cup C.

The automatic water supply device in accordance with this embodiment may measure a size of the cup C by processing the image information acquired by the camera module 100, and measure a height of water present in the cup C using the height measurement unit 90.

However, this is only to describe one embodiment and, according to user needs, the automatic water supply device may include both the camera module 100 and the height measurement unit 90, measure both the size of the cup C and the height of water present in the cup C and then automatically supply water, or include only the camera module 100 to measure the size of the cup C, allow a user to set a quantity of water supplied to the cup C after measurement of the size of the cup C and then supply water to the cup C, without limiting the scope and spirit of the disclosure.

Hereinafter, a method of calculating diameter, height, inclination, etc. of the cup C using the camera module 100 will be described.

Figure 9:
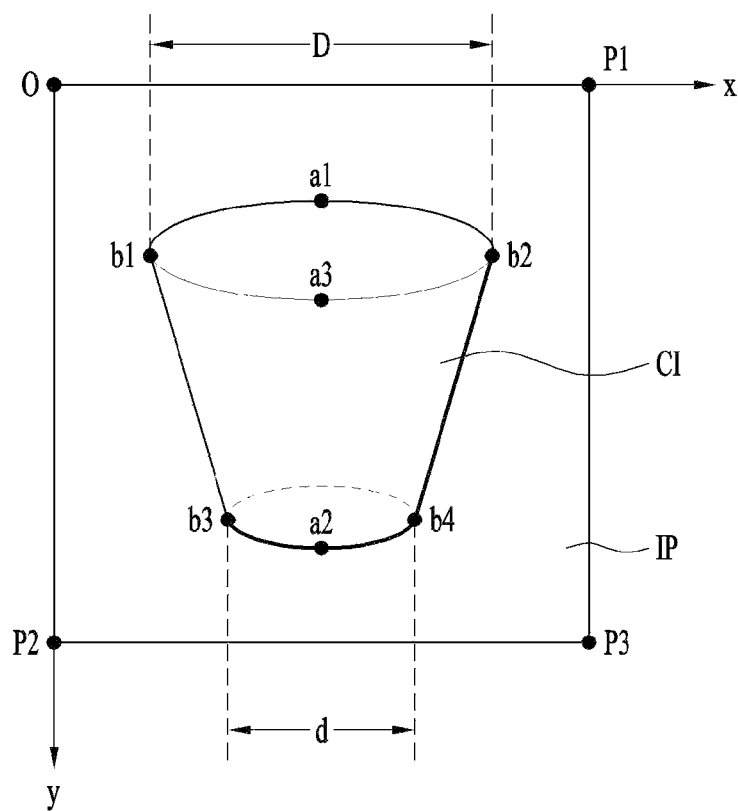
FIG. 9 is a plan view of an image of a cup picked up by an image sensor of the camera module in accordance with the embodiment.
Figure 10:
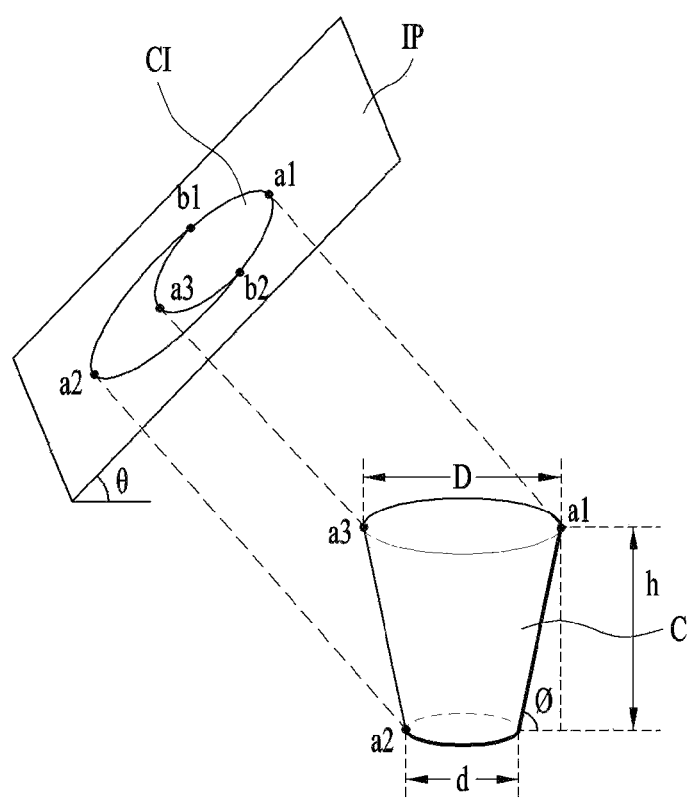
FIG. 10 is a view three-dimensionally illustrating the image of the cup picked up by the image sensor of the camera module in accordance with the embodiment.
Figure 11:
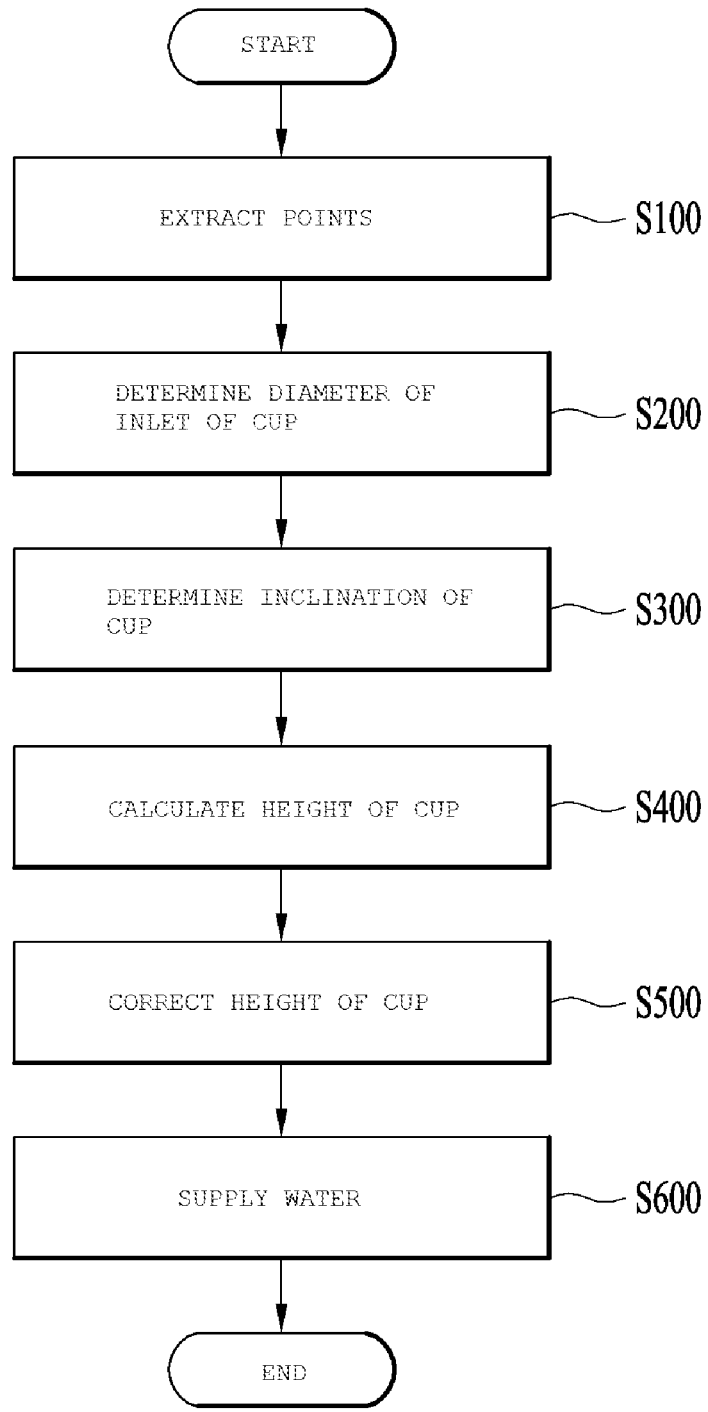
FIG. 11 is a flowchart illustrating a method of calculating a height of the cup by the image sensor of the camera module in accordance with the embodiment.

FIG. 9 is a plan view of an image of a cup picked up by the image sensor of the camera module in accordance with the embodiment, FIG. 10 is a view three-dimensionally illustrating the image of the cup picked up by the image sensor of the camera module in accordance with the embodiment, and FIG. 11 is a flowchart illustrating a method of calculating a height of the cup by the image sensor of the camera module in accordance with the embodiment.

With reference to FIGS. 9, 10 and 11, the camera module 100 in accordance with this embodiment may acquire a cup image CI on an image plane IP by photographing a cup C.

The cup C may have a cylindrical shape having an upper surface which is open and, herein, a diameter of the upper surface of the cup C may be equal to or different from a diameter of a lower surface of the cup C.

If the diameter of the upper surface of the cup C is equal to the diameter of the lower surface of the cup C, determination of an inclination of the cup (Operation S300 in FIG. 11), which will be described later, will be omitted.

After acquisition of the cup image CI, the method may include point extraction (Operation S100) in which both end points b1 and b2 of the upper surface of the cup C in a direction vertical to the height direction of the cup C, a highest point a1 of the upper surface of the cup C and a lowest point a2 of the lower surface of the cup are extracted.

The cup image CI may be extracted on the rectangular image plane IP.

Coordinates on the image plane IP may be acquired using the four points a1, a2, b1 and b2 extracted in point extraction (Operation S100).

For example, if a first apex O corresponding to one of four apexes of the image plane IP is set as an origin (0,0), an axis proceeding from the first apex O to a second apex P1 is set as the x-axis and an axis proceeding from the first apex O to a third apex P2 is set as the y-axis, the image plane IP may form a rectangular coordinate system, coordinates of respective positions of the four points a1, a2, b1 and b2 extracted in point extraction (Operation S100) may be acquired, and lengths, etc. may be extracted using the coordinates.

The coordinates of the first point a1 are defined as (a1x, a1y), the coordinates of the second point a2 are defined as (a2x, a2y), the coordinates of the third point b1 are defined as (b1x, b1y) and the coordinates of the fourth point b2 are defined as (b2x, b2y).

A diameter D of the upper surface of the cup C (hereinafter, referred to as an inlet of the cup C) may be determined (Operation S200) using the x coordinates of the third point b1 and the fourth point b2 out of the four points a1, a2, b1 and b2 extracted in point extraction (Operation S100).

The diameter D is calculated using Equation below.

$$D = (b2x - b1x) \qquad \text{<Equation 1>}$$

After calculation of the diameter D of the cup C, coordinates of a fifth point a3 located at a position, which is point symmetrical to the first point a1 about the center of the inlet of the cup C, may be calculated.

The coordinates of the fifth point a3 may be calculated using Equation below.

$$a3y = D \cos\theta + a1y \qquad \text{<Equation 2>}$$

These coordinates serve to, if the camera module 100 arranged in the automatic water supply device is inclined at a designated angle θ, reflect the inclination angle θ.

After calculation of the coordinates of the fifth point a3, the method may include determination of cup inclination (Operation S300) in which the cup inclination φ is calculated.

The cup inclination φ may be calculated using Equation below.

$$\varphi = \tan^{-1}(b2y - (a2y - d\cos\theta/2)/b2x - (a2x + d/2)) \times \cos\theta \qquad \text{<Equation 3>}$$

In order to calculate the cup inclination in determination of the cup inclination (Operation S300), a diameter d of the lower surface of the cup C is necessary.

Therefore, in order to calculate the cup inclination, the camera module 100 in accordance with this embodiment may extract both end points, a fifth point b3 and a sixth point b4, of the lower surface of the cup image CI on the image plane IP.

Coordinates of the fifth point b3 may be (b3x, b3y), and coordinates of the sixth point b4 may be (b4x, b4y).

Therefore, the diameter d of the lower surface of the cup may be calculated using Equation below.

$$d = b4x - b3x \qquad \text{<Equation 4>}$$

Hereafter, the method may include calculation of a height of the cup (Operation S400).

Such operation is necessary if the diameter of the inlet of the cup and the diameter of the bottom surface of the cup are different and thus the side surface of the cup is inclined, and such operation may be omitted if the diameter of the inlet of the cup and the diameter of the bottom surface of the cup are equal, as described above.

The height h of the cup may be calculated using Equation below.

$$h = ((a3y - a2y)/\cos(\theta + \varphi))\cos\theta \qquad \text{<Equation 5>}$$

A volume of the cup may be calculated using the height h of the cup, the diameter D of the inlet of the cup and the diameter d of the bottom surface of the cup, calculated in the above-described Operations.

However, the height of the cup is a value acquired using an image picked up by the camera module 100 and may thus differ from an actual height h of the cup C.

Therefore, in order to solve such a problem in the automatic water supply device in accordance with this embodiment, the method may further include cup height correction (Operation S500) in which the actual height h' of the cup C is corrected using the height h of the cup, acquired using the cup image CI.

The actual height h' of the cup C may be calculated using Equation below.

$$h' = M \times C \times h \qquad \text{<Equation 6>}$$

M is a parameter to correct a magnification, and C is a parameter to correct distortion.

The control unit 110 may extract information, such as a height of the cup C, etc., through the above-described process and supply a quantity of water corresponding to the information to the cup C (Operation S600).

Figure 12:
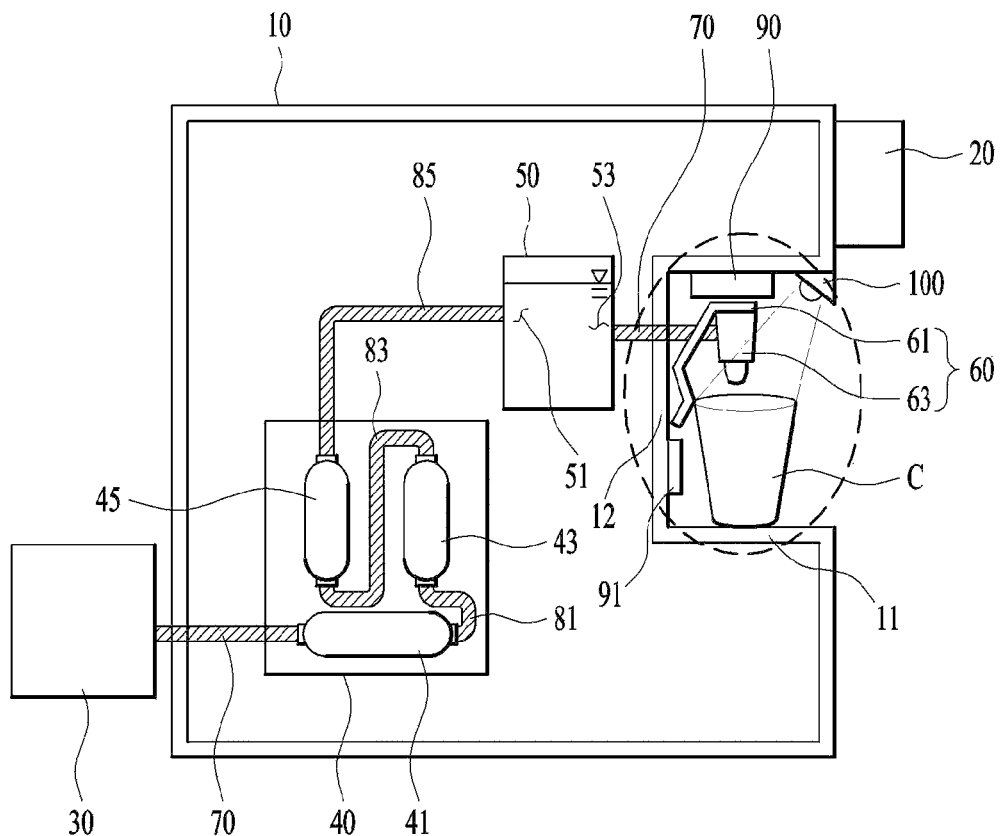
FIG. 12 is a view illustrating an automatic water supply device having a camera module in accordance with another embodiment.

FIG. 12 is a view illustrating an automatic water supply device having a camera module in accordance with another embodiment.

With reference to FIG. 12, the automatic water supply device in accordance with this embodiment may include a water source 30 provided to feed water to the inside of the automatic water supply device, a filter unit 40 provided to filter out contaminants and foreign substances from water fed from the water source 30, a water storage unit 50 to store water, and a water intake member 60 provided to extract water stored in the water storage unit 50 to the outside.

The water intake member 60 may include a discharge valve 61 provided to adjust a quantity of water extracted to the outside, and a discharge unit 63 provided to form a water discharge path.

The discharge valve 61 may be provided such that, when a user applies pressure to the discharge valve 61 using a container to contain water, water is discharged from the discharge unit 63, and the discharge valve 61 may include a pressing part (not shown) providing a space pressed by the user using the container and a pivot part (not shown) to pivot the pressing part (not shown) using force applied to the pressing part (not shown) and thus to open or close the discharge valve 61.

The water source 30 may be a tank which stores unpurified raw water, or be a water pipe connecting a water supply source to the inside of a building. In this embodiment, the filter unit 40 may include a first filter 41 to remove impurities having a large particle size, such as rust, soil, sand, etc., a second filter 43 to remove heavy metals, phenol, bacteria, etc. from water through reverse osmosis, and a third filter 45 to finally purify water.

However, the number and functions of filters of the filter unit 40 may be different according to user needs and are not limited to the description of this embodiment as long as the filters may have a function of purifying water of the water source 30.

When a user opens the discharge unit 63, water may be discharged to the outside of the automatic water supply device. Although only one discharge unit 63 may be provided, two discharge units 63, i.e., a discharge unit 63 for cold water and a discharge unit 63 for hot water, may be generally provided, or three or more discharge units 63 may be provided.

The automatic water supply device in accordance with this embodiment may include a water supply duct 70 providing a flow path of water from the water source 30 to the filter unit 40, a filter duct unit 81, 83 and 85 providing flow paths of water within the filter unit 40, and a discharge duct 70 providing a flow path of water from the water storage unit 50 to the water intake member 60.

The filter duct unit 80 may include a first filter duct 81 providing a flow path of water from the first filter 41 to the second filter 43, a second filter duct 83 providing a flow path of water from the second filter 43 to the third filter 45, and a third filter duct 85 providing a flow path of water from the third filter 45 to the water storage unit 50.

Recently, according to spread of Internet of Things (IoT) and increase in smart home appliances including automatic water supply devices, smart automatic water supply devices are widely used in homes.

IoT is technology in which various things embedded with sensors and communication functions are connected to the Internet.

Here, the things may be various embedded systems including home appliances, mobile equipment, wearable computers, etc.

Therefore, the automatic water supply device in accordance with this embodiment may be provided such that, when a user applies pressure to the discharge valve 61, water is supplied from the water intake member 60, as described above, or be provided such that the automatic water supply device automatically recognizes a height of a cup C seated thereon and thus automatically supply a quantity of water matching the height of the cup C.

Here, if the size of the cup is not known, water may overflow the cup and, thus, a sensor to measure sizes of various cups is necessary.

Representatively, a stereo camera using binocular disparity may be used, as a method of measuring a height of a cup using a camera module.

However, in order to implement the stereo camera, the number of necessary optical systems is increased and, thus, manufacturing costs may be increased.

Further, in order to extract depth information, a complicated algorithm is required and calibration for extracting the depth information is carried out and, thus, a measurement time may be increased.

Therefore, the camera module and the automatic water supply device including the same in accordance with this embodiment may include a sensor 90 and/or a camera module 100, and measure a size of a cup C and a height of water in the cup C.

The sensor 90 may include a light emitting unit 92 which is arranged on the sensor 90 and emits light, and a light receiving unit (not shown) which collects light emitted by the light emitting unit 92 and reflected by a target object.

The light emitting unit 92 may output infrared (IR) light. IR light may be light having a wavelength of 800 nm or more.

The light emitting unit 92 may include a light conversion unit (not shown).

A light source may include at least one laser diode (LD) or light emitting diode (LED) which emits infrared light.

The laser diode may include a vertical cavity surface emitting laser.

The vertical cavity surface emitting laser is a kind of laser diode which converts an electrical signal into an optical signal, i.e., a light source which may substitute for a conventional side light emitting semiconductor laser, and the vertical cavity surface emitting laser is integrated at a high density and may thus achieve element miniaturization, has low power consumption and excellent heat resistance and is manufactured through a simple process.

The light conversion unit (not shown) may modulate light output from the light emitting unit 92.

The light conversion unit (not shown) may perform, for example, pulse modulation or phase modulation of light output from the light emitting unit 92.

Therefore, the light emitting unit 92 may output light while the light source blinks at a designated interval.

The light conversion unit (not shown) may include a holographic optical element (HOE).

The holographic optical element is a kind of diffractive optical element (DOE) manufactured using holography, and is an optical element designed to reproduce or transform a waveform recorded in a hologram to make a desired form of transmitted or reflected light.

Therefore, the holographic optical element is an optical element which is operated by the law of diffraction other than the law of reflection or the law of refraction.

The light receiving unit (not shown) receives light which is output from the light emitting unit 92 and then reflected by an object.

The light receiving unit (not shown) may convert received light into an electrical signal.

The light receiving unit (not shown) may be an image sensor including a photodiode (PD) or a complementary metal-oxide semiconductor (CMOS).

Further, the automatic water supply device in accordance with this embodiment may include a recognition unit 91 which is arranged on one surface of the automatic water supply device and determines whether or not a cup is located on a body 10.

For example, the recognition unit 91 in accordance with this embodiment may be arranged on a rear surface portion 12 of the body 10.

The recognition unit 91 may be a proximity and illumination sensor.

The proximity and illumination sensor is a sensor in which the function of an illumination sensor and the function of a proximity sensor are integrated.

In more detail, proximity sensors sense approach of an object without physical contact and are divided into a magnetic proximity sensor, an ultrasonic proximity sensor, a capacitive proximity sensor, an inductive proximity sensor, an optical proximity sensor, etc., according to sensing principles. The optical proximity sensor includes a light emitting element to emit light and a light receiving element to sense light, the light emitting element mainly employs an IR light emitting diode (IR LED) and the light receiving element employs a phototransistor or a photodiode.

Further, an illumination sensor serves to sense illumination which human eyes sense, and includes a light receiving element to sense visible light. Therefore, the optical proximity sensor and the illumination sensor are similar and, thus, small electronic devices requiring both an illumination sensor and a proximity sensor, for example, smartphones, etc., tend to use a proximity and illumination sensor in which an illumination sensor and a proximity sensor are integrated.

In the proximity and illumination sensor, a light emitting unit and a light receiving unit are generally integrated into one assembly, the light emitting unit radiates infrared light, and the light receiving unit includes an infrared light receiving unit to sense infrared light output from the light emitting unit and reflected by an object to detect approach of the object, and a visible light receiving unit to sense visible light therearound to detect illumination.

However, this is only to describe one embodiment, and the recognition unit 91 in accordance with this embodiment may be provided only to determine whether or not the cup C is located at a designated position of the automatic water supply device and be variously modified according to user requirements, and thus is not limited to the proximity and illumination sensor without departing from the scope and spirit of the disclosure.

Figure 13:
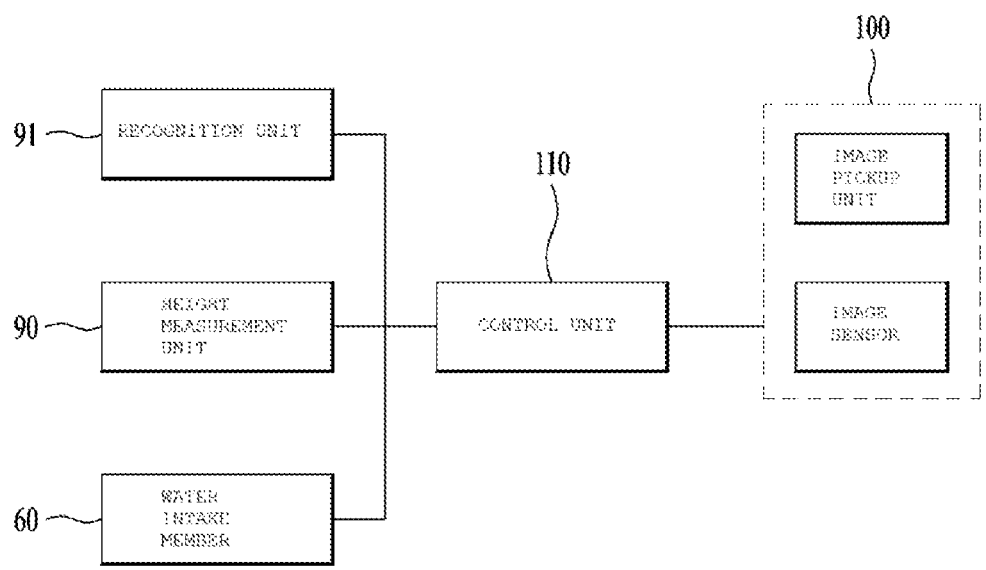
FIG. 13 is a block diagram of the automatic water supply device in accordance with the embodiment.

FIG. 13 is a block diagram of the automatic water supply device in accordance with the embodiment.

With reference to FIG. 13, the automatic water supply device in accordance with this embodiment may include the sensor 90 to measure information, such as a height of water supplied to the inside of the cup C, a height of the cup C, etc., the recognition unit 91 to determine whether or not the cup C is located at a designated position of the automatic water supply device, the camera module 100 to extract information, such as the height of the cup C, etc., a control unit 110 to control a quantity of water supplied to the cup C by processing image information of the cup C measured by the camera module 100, and the water intake member 60 to supply water to the cup C on command from the control unit 110.

The sensor 90 may include a depth information extraction device and thus measure a height of water contained in the cup C.

The depth information extraction device may be a Time of flight (TOF) camera including a light output unit to radiate light toward a target object, and a light input unit to collect light reflected by the target object.

For example, by outputting designated light toward the upper surface of the cup C seated on the automatic water supply device in accordance with this embodiment and collecting light reflected by the upper surface of water contained in the cup C, depth information of the inside of the cup C may be acquired by calculating a time from when light is output to the upper surface of the cup C to when light reflected by the upper surface of water contained in the cup is received.

The camera module 100 may include an image pickup unit 102 to pick up image information of the cup C seated on the automatic water supply device by photographing the cup C, and an image sensor 102 to process the image information picked up by the image pickup unit 102.

Differently from the conventional stereo camera, the image information of the cup C picked up by one image pickup unit 102 may be converted into an electrical signal and the electrical signal may be transmitted to the control unit 110, and the control unit 110 may calculate diameter, height, inclination, etc. of the cup C using the image information of the cup C.

The automatic water supply device in accordance with this embodiment may measure a size of the cup C by processing the image information picked up by the camera module 100, and measure a height of water present in the cup C using the sensor 90.

However, this is only to describe one embodiment and, according to user needs, the automatic water supply device may include both the camera module 100 and the sensor 90, measure both the size of the cup C and the height of water present in the cup C and then automatically supply water, or include only the camera module 100 to measure the size of the cup C, allow a user to set a quantity of water supplied to the cup C after measurement of the size of the cup C and then supply water to the cup C, without limiting the scope and spirit of the disclosure.

As described above, the control unit 110 in accordance with this embodiment may measure a height of the cup C or a quantity of water in the cup C by measuring a time from when light is output from the light emitting unit 92 of the sensor 90 to when light reflected by the lower surface of the cup C is returned to the light receiving unit (not shown) and, since the cross-sectional size of the cup C is finite, a field of view (FOV), i.e., a viewing angle, of light emitted by the light emitting unit 92 may cause problems.

Hereinafter, a configuration to solve problems caused by the viewing angle of the light emitted by the light emitting unit 92 in accordance with this embodiment will be described with reference to FIGS. 14 and 15.

Figure 14:
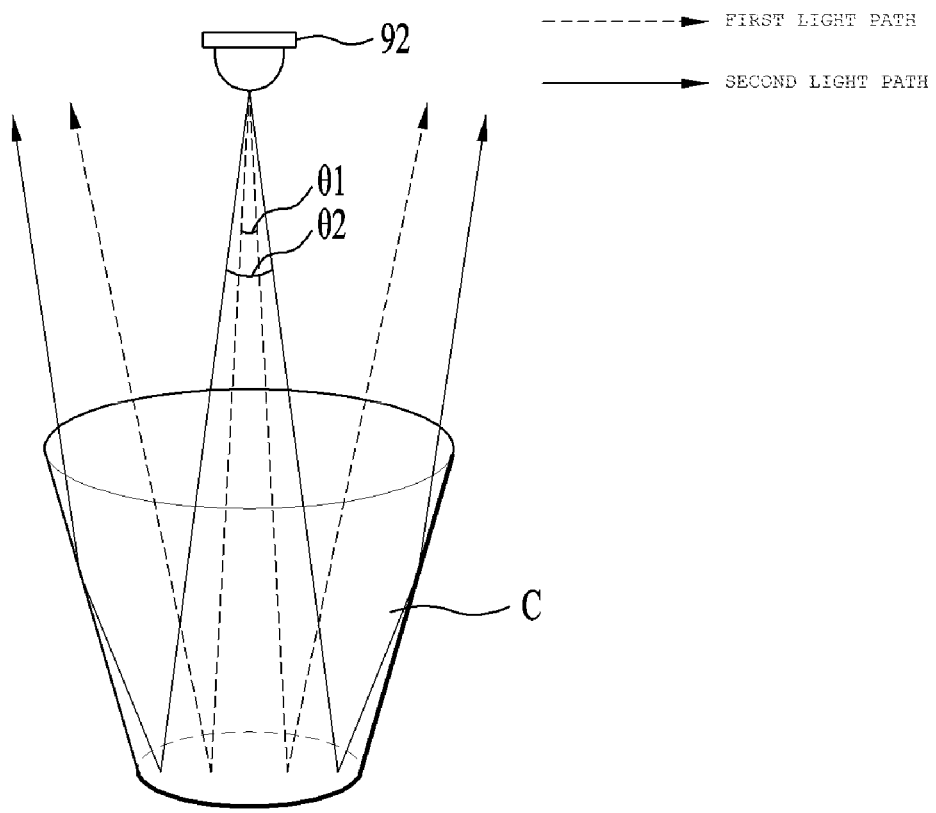
FIG. 14 is a view illustrating paths of light emitted by a light emitting unit of a sensor in accordance with the embodiment.
Figure 15:
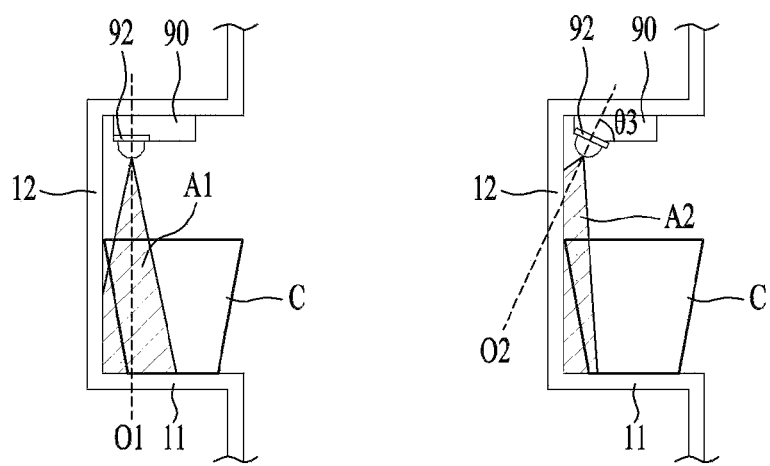
FIG. 15 illustrates light emission areas which are different according to angles of light emitting units of sensors in accordance with other embodiments.

FIG. 14 is a view illustrating paths of light emitted by the light emitting unit of the sensor in accordance with the embodiment, and FIG. 15 illustrates light emission areas which are different according to angles of light emitting units of sensors in accordance with other embodiments.

With reference to FIG. 14, the light emitting unit 92 of the sensor 90 in accordance with this embodiment may emit light toward the lower surface of the cup C so as to have at least one viewing angle.

For example, a path of light emitted so as to have a first viewing angle $\theta 1$ may be referred to as a first light path, and a path of light emitted so as to have a second viewing angle $\theta 2$ greater than the first viewing angle $\theta 1$ may be referred to as a second light path.

While light passing through the first light path may be reflected by the lower surface of the cup C and be collected by the light receiving unit (not shown) of the sensor 90, light passing through the second light path may be reflected by the lower surface of the cup C and be collected by the light receiving unit (not shown) of the sensor 90 via the side surface of the cup C.

Therefore, in the light emitting unit 92 in accordance with this embodiment, noise occurs due to the first light path through which light is reflected by the lower surface of the cup C and the second light path through which light is reflected by the lower surface of the cup C and the side surface of the cup C, and a distance from the cup C measured by the sensor 90 may differ from an actual distance from the cup C.

A viewing angle of light emitted by the light emitting unit 92 which does not pass through the side surface of the cup C may be set using Equation below using a diameter D of the bottom surface of the cup and a height L from the bottom surface of the cup to the light emitting unit 92.

$$\theta = 2 \tan^{-1}(D/4L)$$

Further, the light emitting unit 92 in accordance with this embodiment may more accurately measure the size of the cup C and the height of water in the cup C, as the viewing angle is decreased.

However, it is physically impossible to indefinitely decrease the viewing angle of the light emitting unit 92.

Therefore, in order to solve such a problem, sensors 90 and light emitting units 92 in accordance with other embodiments will be described hereinafter with reference to FIG. 15.

FIG. 15(a) illustrates an automatic water supply device in which a first optical axis O1 being a central axis (hereinafter, referred to as an optical axis) of light emitted by the light emitting unit 92 of the sensor 90 is vertically provided to form a designated angle (90 degrees) with a plane of a container seating portion, on which a cup C is placed, or the lower surface of the cup C.

Further, FIG. 15(b) illustrates an automatic water supply device in which a second optical axis O2 being an optical axis of light emitted by the light emitting unit 92 of the sensor 90 is provided to form a designated angle θ3 with a plane of a container seating portion, on which a cup C is placed, or the lower surface of the cup C.

If, as exemplarily shown in FIG. 15(b) differing from FIG. 15(a), the second optical axis O2 of light emitted by the light emitting unit 92 of the sensor 90 is provided to form the designated angle θ3 with the plane of the container seating portion, on which the cup C is placed, or the lower surface of the cup C, a part of a second emission area A2 corresponding to an emission area of light emitted by the light emitting unit 92 shown in FIG. 15(b) is located within a rear surface portion 12, differently from a first emission area A1 corresponding to an emission area of light emitted by the light emitting unit 92 shown in FIG. 15(a).

That is, if the light emitting unit 92 of the sensor 90 is provided to be tilted so as to form the designated angle θ3 with the lower surface of the cup C, a part of the second emission area A2 may be located within the rear surface portion 12 and thus a viewing angle of light emitted by the light emitting unit 92 may be reduced.

For example, the designated angle θ3 formed between the light emitting unit 92 and the lower surface of the cup C may satisfy conditional expression 1 below.

$$90° - B \leq A \leq 90° \qquad \text{<Conditional expression 1>}$$

Here, B is 0.5 times a viewing angle of the light emitted by the light emitting unit.

The sensor 90 may measure information, such as a height of the cup C, etc., or a quantity of water in the cup C using the above-described configuration and, if the quantity of water in the cup C is a designated height or lower, the measured quantity of water in the cup C may differ from an actual quantity of water in the cup C.

Figure 16:
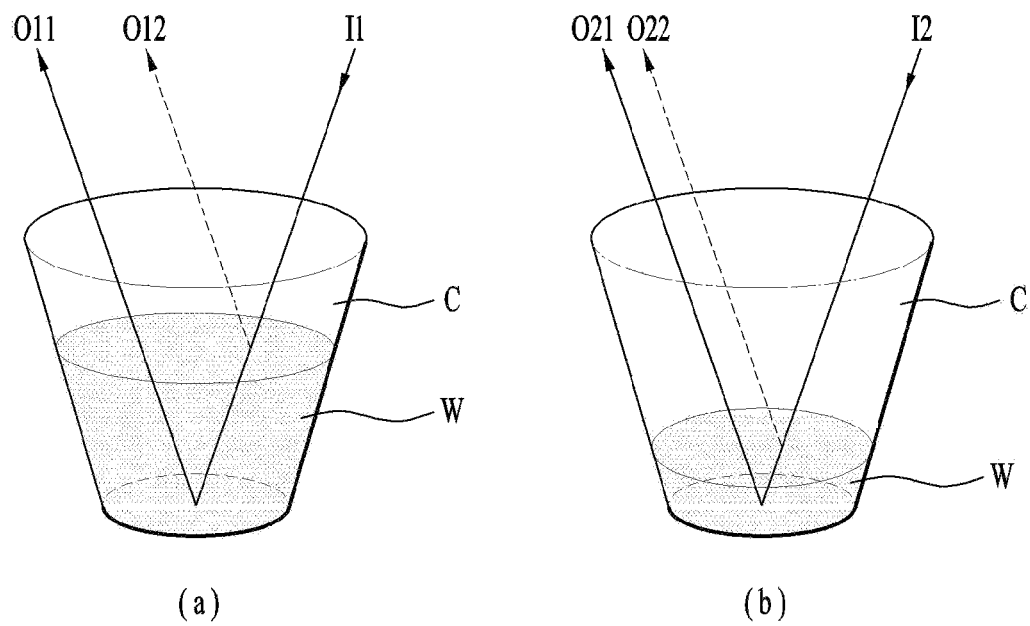
FIG. 16 illustrates reflection paths of light emitted by the light emitting unit according to quantities of water stored in a cup in accordance with the embodiment.

Hereinafter, a configuration to solve a difference between the measured quantity of water in the cup C and the actual quantity of water in the cup C in accordance with this embodiment if the quantity of water in the cup C is a designated height or lower will be described with reference to FIGS. 16 and 17.

FIG. 16(a) illustrates reflection paths of light emitted by the light emitting unit in accordance with this embodiment if the quantity of water contained in the cup is a designated quantity or more, and FIG. 16(b) illustrates reflection paths of light emitted by the light emitting unit in accordance with this embodiment if the quantity of water contained in the cup is the designated quantity or less.

If the designated quantity or more of water is contained in the cup, as exemplarily shown in FIG. 16(a), first incident light I1 may be divided into first lower reflected light O11 which is reflected by the lower surface of the cup, and first upper reflected light O12 which is reflected by the upper surface of the water contained in the cup.

In this case, the sensor 90 in accordance with this embodiment may measure information, such as a height of the cup C, etc., and a quantity of water in the cup C by comparing the first lower reflected light O11 and the first upper reflected light O12.

However, if the designated quantity or less of water is stored in the cup, as exemplarily shown in FIG. 16(b), second incident light I2 may be divided into second lower reflected light O21 which is reflected by the lower surface of the cup, and second upper reflected light O22 which is reflected by the upper surface of water contained in the cup.

In this case, since the quantity of water is small and thus there is a little light path difference between the second lower reflected light O21 and the second upper reflected light O22, the sensor 90 may not distinguish the second lower reflected light O21 and the second upper reflected light O22 from each other.

If the sensor 90 does not distinguish the second lower reflected light O21 and the second upper reflected light O22 from each other, the second upper reflected light O22 may be recognized as a noise signal and thus the quantity of water may not be accurately measured.

Therefore, in order to solve such a problem, the container seating portion 11 of the body 10 of the automatic water supply device in accordance with this embodiment, on which the cup C is seated, may be formed of a material having reflectivity of a designated range.

Further, since, if the entirety of the container seating portion 11 of the body 10 is formed of a material having reflectivity, an additional process is necessary and costs may thus be increased, the entirety of the container seating portion 11 is not formed of a material having reflectivity and a coating member (not shown) having reflectivity of a designated range may be arranged on the surface of the container seating portion 11.

If the coating member (not shown) is provided or the entirety of the container seating portion 11 is not formed of a material having reflectivity, reflectivity of the container seating portion 11 may be 15% to 35%.

However, such reflectivity is only to describe one embodiment and may be variously modified according to user needs, as long as, if a quantity of water contained in the cup C is small, the quantity of water may be accurately measured, without limiting the scope and spirit of the disclosure.

It may be understood from a graph shown in FIG. 6 that an error between an actual distance and a measured distance is reduced by providing the container seating portion 11 of the body 10 or the coating member (not shown) formed of a material having designated reflectivity.

Figure 17:
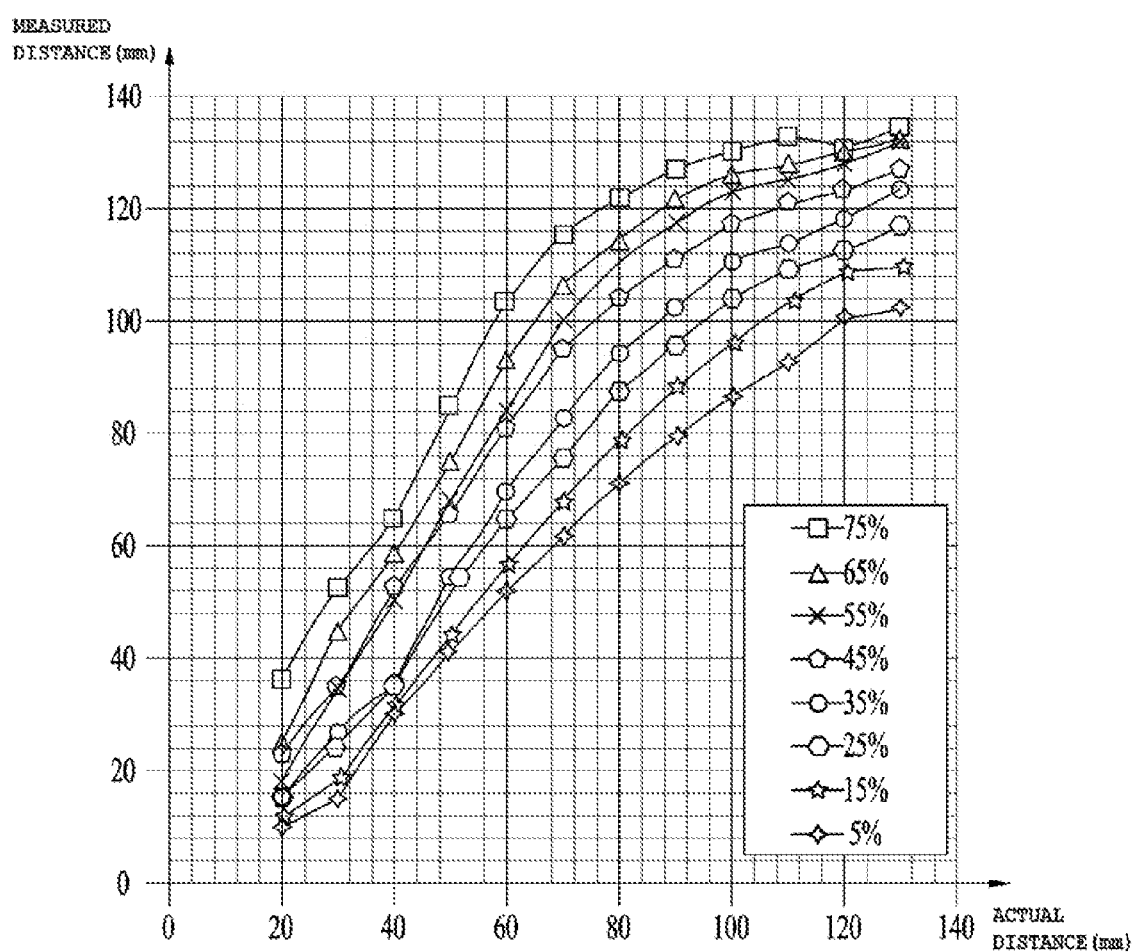
FIG. 17 is a graph representing a measured distance and an actual distance to a cup according to reflectivity of a lower end of the automatic water supply device in accordance with the embodiment, on which the cup is placed.

FIG. 17 is a graph representing a measured distance and an actual distance to a cup according to reflectivity of a lower end of the automatic water supply device in accordance with the embodiment, on which the cup is placed.

In the graph, the x-axis represents an actual distance from the sensor to the lower surface of the cup or the upper surface of water in the cup C, and the y-axis represents a measured distance from the sensor to the lower surface of the cup or the upper surface of water in the cup C.

As reflectivity of the container seating portion 11 is changed from 5% to 75%, actual distances and measured distances are shown.

As known from the graph, if reflectivity of the container seating portion 11 or the coating member (not shown) is 15% to 35%, an inclination may be calculated using a regression equation of the graph, and the inclination of the regression equation is close to 1.

Therefore, it may be understood that, if reflectivity of the container seating portion 11 or the coating member (not shown) is 15% to 35%, the surface of water may be measured while most effectively excluding noise occurring if a quantity of water in the cup C is small.

Although the preferred embodiments have been disclosed for illustrative purposes, those skilled in the art will appreciate that various modifications, applications, additions and substitutions are possible, without departing from the scope and spirit of the disclosure. For example, respective elements of the embodiments may be modified. Further, it should be understood that differences regarding the modifications and applications are within the spirit and scope of the disclosure which is defined in the appended claims and their equivalents.

MODE FOR INVENTION

Various embodiments have been described in the best mode for carrying out the invention.

INDUSTRIAL APPLICABILITY

An automatic water supply device in accordance with one embodiment, in which sensors to measure a height of a container and a height of water contained in the container are arranged adjacent to a water intake member supplying water, is applicable to a water purifier, etc., so as to supply water to containers having various sizes without overflowing.

The invention claimed is:

1. An automatic water supply device comprising:
a container seating portion having one open side such that a container can be placed thereon;
a water intake member arranged at an upper portion of the container seating portion so as to supply a liquid to the container;
a container height measurement unit and a water level measurement unit arranged adjacent to the water intake member; and
a control unit to check whether or not a level of the liquid in the container reaches a predetermined height by comparing a height of the container, measured by the container height measurement unit, with the level of the liquid, measured by the water level measurement unit, and to adjust the level of the liquid in the container based on a result of checking,
wherein the container height measurement unit comprises a plurality of first optical sensors to sense both ends of an upper end of the container, and measures the height of the container in response to a result of sensing by the first optical sensors,
wherein the water level measurement unit comprises a second optical sensor to sense the level of the liquid in the container, and
wherein an exit angle of light emitted by the second optical sensor to the liquid varies according to a height of the container seating portion.

2. The automatic water supply device according to claim 1, wherein an exit angle of light from one first optical sensor is different from an exit angle of light from another first optical sensor.

3. The automatic water supply device according to claim 2, wherein one of the first optical sensors and the second optical sensor comprises a Time of Flight (ToF) sensor.

4. The automatic water supply device according to claim 3, wherein the Time of Flight (ToF) sensor is a sensor calculating a distance by measuring a time taken to emit light and then to receive reflected light.

5. The automatic water supply device according to claim 4, wherein the first optical sensors of the container height measurement unit have different exit angles of light.

6. The automatic water supply device according to claim 5, wherein the first optical sensors are disposed adjacent to the water intake member.

7. The automatic water supply device according to claim 1, wherein an exit angle of light emitted by the second optical sensor to the liquid is 5° to 7°.

8. The automatic water supply device according to claim 1, wherein the container height measurement unit is arranged on at least one surface of the container seating portion.

9. The automatic water supply device according to claim 8, wherein the container height measurement unit senses at least one of an upper end and a lower end of the container.

10. The automatic water supply device according to claim 9, wherein the container height measurement unit is arranged on a lower surface of the container seating portion.

11. The automatic water supply device according to claim 9, wherein the container height measurement unit comprises:
a first measurement unit arranged on an upper surface of the container seating portion; and
a second measurement unit arranged on a lower surface of the container seating portion,
wherein an extension line of a point, where the first measurement unit is arranged, in the vertical direction and an extension line of a point, where the second measurement unit is arranged, in the vertical direction are spaced apart from each other.

12. The automatic water supply device according to claim 8, wherein the container height measurement unit comprises:
light emitting units arranged on one side surface of the container seating portion in the length direction of the container; and
light receiving units arranged so as to correspond to the light emitting units.

13. The automatic water supply device according to claim 12, wherein the light emitting units are arranged in parallel on a first side surface of the container seating portion, and the light receiving units are arranged in parallel on a second side surface of the container seating portion facing the first side surface.

14. The automatic water supply device according to claim 12, wherein the light emitting units are disposed in parallel on a third side surface of the container seating portion, and the light receiving units are disposed in parallel adjacent to the light emitting units on the third side surface of the container seating portion.

15. The automatic water supply device according to claim 1, wherein the container height measurement unit and the water level measurement unit include a Time of Flight (ToF) sensor.

16. An automatic water supply device comprising:
a container seating portion having one open side such that a container can be placed thereon;
a water intake member arranged at an upper portion of the container seating portion so as to supply a liquid to the container;
a container height measurement unit and a water level measurement unit arranged adjacent to the water intake member; and
a control unit to check whether or not a level of the liquid in the container reaches a predetermined height by comparing a height of the container, measured by the container height measurement unit, with the level of the liquid, measured by the water level measurement unit, and to adjust the level of the liquid in the container based on a result of checking,
wherein the container height measurement unit comprises a plurality of first optical sensors to sense both ends of an upper end of the container, and measures the height of the container in response to a result of sensing by the first optical sensors,
wherein the water level measurement unit comprises a second optical sensor to sense the level of the liquid in the container,
wherein an exit angle of light from one first optical sensor is different from an exit angle of light from another first optical sensor,
wherein one of the first optical sensors and the second optical sensor comprises a Time of Flight (ToF) sensor,
wherein the Time of Flight (ToF) sensor is a sensor calculating a distance by measuring a time taken to emit light and then to receive reflected light,
wherein the first optical sensors of the container height measurement unit have different exit angles of light,
wherein the first optical sensors are disposed adjacent to the water intake member, and
wherein an exit angle of light emitted by the second optical sensor to the liquid varies according to a height of the container seating portion, and comprising the container disposed on the height of the container seating portion.

17. The automatic water supply device according to claim 16, wherein the exit angle of light emitted when the height of the container seating portion is low is greater than the exit angle of light emitted when the height of the container seating portion is high.

18. An automatic water supply device comprising:
a container seating portion having one open side such that a container can be placed thereon;
a water intake member arranged at an upper portion of the container seating portion so as to supply a liquid to the container;
a container height measurement unit and a water level measurement unit arranged adjacent to the water intake member; and
a control unit to check whether or not a level of the liquid in the container reaches a predetermined height by comparing a height of the container, measured by the container height measurement unit, with the level of the liquid, measured by the water level measurement unit, and to adjust the level of the liquid in the container based on a result of checking,
wherein the container height measurement unit includes an exit angle adjustment unit having a plurality of lens adjusting an exit angle of light emitted by the container height measurement unit, and
wherein an exit angle of light emitted by the water level measurement unit to the liquid varies according to a height of the container seating portion.

19. The automatic water supply device according to claim 18, wherein the container height measurement unit comprises a Time of Flight (ToF) sensor.

20. The automatic water supply device according to claim 18, wherein the exit angle of light emitted by the container height measurement unit is 5° to 7°.

* * * * *